Dec. 7, 1954  E. H. SNYDER  2,696,451
PLASTIC EDGE ATTACHMENT
Filed Feb. 8, 1946
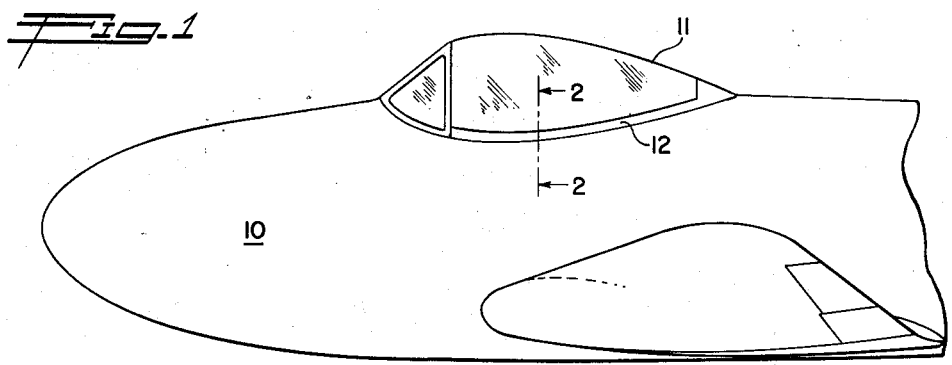
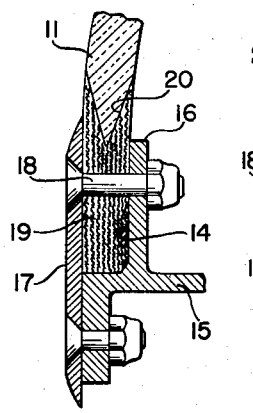
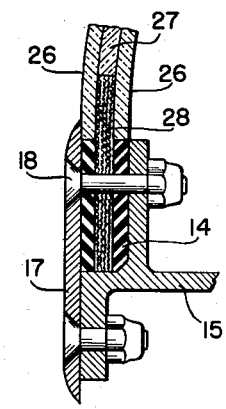
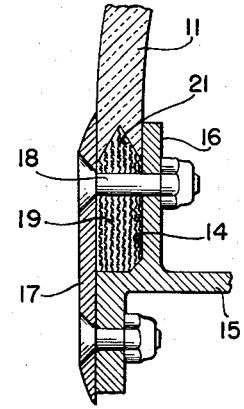
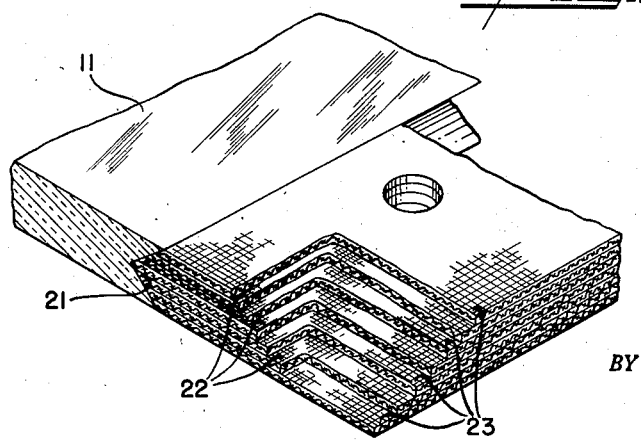
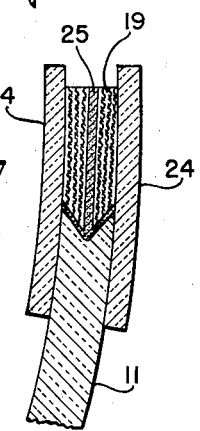
INVENTOR.
EUGENE H. SNYDER
BY
Agent

United States Patent Office 2,696,451
Patented Dec. 7, 1954

2,696,451

PLASTIC EDGE ATTACHMENT

Eugene H. Snyder, Burbank, Calif., assignor to Lockheed Aircraft Corporation, Burbank, Calif.

Application February 8, 1946, Serial No. 646,308

10 Claims. (Cl. 154—43)

This invention relates to improved attaching means or edge strips for mounting windowpanes, or domed or formed transparent enclosures such as the methyl methacrylate solid or laminated plastics which are commonly molded or free blown into cockpit enclosures, windshields, and the like, for airplanes and other uses.

In present-day high altitude aircraft it is necessary to firmly support such cockpit enclosures, windows, and the like, to withstand internal pressures arising from cabin comfort pressurization wherein positive cabin differential pressures of six pounds or more, relative to ambient pressure at high altitudes, imposes high tensile stresses and bursting pressures on such enclosures. Inasmuch as such acrylics have an expansion rate of about four times that of the customary aluminum frame therefor, it has also been a serious problem to transmit and distribute such pressures and stresses from the plastic enclosure to the frame, and to simultaneously seal the enclosure to the structure or frame therefor to retain the positive internal pressure.

Heretofore the conventional method of attachment has been to drill a series of oversize holes in the edges of the plastic enclosure and to install rubber grommets and steel liners therein for the attaching bolts in attempts to reduce the possibility of crack formation due to concentration of bearing loads and the expansion and contraction of the canopy relative to its frame. Such conventional bolted methods of attachment produce localized stress concentrations in the plastic which reduce the efficiency of edge attachments in direct tension to as low as 30% of the strength of the plastic, so that in terms of average stress at failure, the bolted attachments develop approximately 2500 pounds per square inch in the plastic material.

It is accordingly an important object of this invention to provide an improved canopy edge attachment wherein a laminated fiber glass edge is cured, cemented or cast to the edge of the laminated or solid plastic to provide a high strength margin in which attaching bolts may be directly inserted in suitable holes. I have found that a fiber glass laminate, approximating the thickness of the plastic canopy material, is capable of developing 85% efficiency, as compared to 30% for the foregoing described conventional method of attachment, equivalent to a maximum stress at failure as high as 6500 pounds per square inch. Such an arrangement is capable of developing and sustaining high stresses, and eliminates the need of conventional rubber grommets and metal bushings in the holes, and the resulting necessity of removing the canopy to enlarge the holes therefor after locating and drilling pilot (bolt size) holes therein.

It is a further important object of this invention to reduce the load concentrations at attachment points through controlled bearing failure (elongation) in the mounting holes. I accomplish this result by tailoring or modifying the fiber glass edge by the substitution of one or more cotton cloth layers for a similar number of fiber glass layers or laminae. Such modification of the fiber glass laminate also serves to absorb the differential expansion of as much as .006 inch per linear inch due to the extremely low temperatures encountered at high altitudes, as a superimposed tensile strain equivalent to about 2400 pounds per square inch due to such expansion, can be transmitted into the plastic without any deleterious effect.

Other and further objects and features of the invention will be readily understood from the following detailed description of typical preferred forms of the invention wherein references will be made to the accompanying drawings in which:

Figure 1 is a fragmentary view showing the forward part of an airplane fuselage, together with a transparent pilot's enclosure constructed in accordance with the principles of this invention;

Figure 2 is a fragmentary section taken on the line 2—2 of Figure 1 showing the preferred form of mounting edge for the transparent canopy;

Figure 3 is a fragmentary section corresponding to Figure 2 showing an alternative form of edge attachment;

Figure 4 is a fragmentary perspective view of the plastic to edge mounting of Figure 2;

Figure 5 is a fragmentary section showing one method of applying the edge strips to the plastic canopy; and, Figure 6 is a fragmentary section similar to Figures 2 and 3 showing the application of this invention to a laminated type of plastic.

As shown in the drawings:

A portion of an airplane fuselage 10 is shown in Figure 1 to illustrate the location of a pilot's transparent compartment canopy 11, which, because of its compound curvature is most conveniently formed or blown from either plain or laminated transparent plastic material such as methyl methacrylate plastic, commercial examples of which are sold under the trade names of Plexiglas and Lucite. Either the plain or laminated plastic is suitable for my purpose, the laminated version being more shock and burst resistant because of the provision of a central lamination of a polyvinyl butyral resin layer between two panes of the acrylic plastic mentioned above.

The formed or blown canopy 11 may be mounted in a frame 12, which for simplicity, I have shown as a structural part of the airplane fuselage 10, since details providing for necessary access to the cockpit, and/or the jettisoning of the canopy in an emergency, form no part of the present invention. In the diagrammatic mounting shown in Figures 2 and 3, the edges of the canopy 11 are secured in a channel 14 formed between an extension 15 providing one side 16 of the channel and an outer cover plate 17, a series of closely spaced bolts 18 being provided to take the canopy tension as shear stress in the bolts.

The canopy material is subject to high tensile or hoop tension stresses because of cockpit pressurization during high altitude flights. Since the pressure differential over ambient pressures under such conditions may reach six pounds per square inch, it is desirable to provide a canopy and mounting that will withstand a twenty pound pressure test. The canopy material per se could not be conventionally mounted in tension and withstand even the actual pressure differential, due to concentrated loading at the bolt holes, and even with enlarged holes fitting with rubber grommets and steel sleeves, as is conventional practice, such canopies have failed to sustain proof pressures of nine pounds.

The principal feature of my invention involves the casting, bonding or cementing of a woven fiber glass cloth or fabric laminate 19 to the edges of the canopy. I prefer a scarfed or overlapping joint to place this joint at least partially in shear, and because of the extra bonding area provided thereby. Because a straight scarf would extend too far above the edge of the mount, I use a V or inverted V joint of equivalent area as shown respectively at 20 and 21 in Figures 3 and 2. The inverted V joint 21 of Figure 2 can be blunter and set deeper into the frame channel than the alternative showing, and hence is preferable from a practical standpoint.

A pure fiber glass cloth laminate as generally indicated at 19 has been found to develop excessive strength relative to that of the plastic canopy. Accordingly, I prefer to modify the laminate by the substitution of one or more layers of cotton cloth or fabric 22 such as coarsely woven muslin, interleaved with fiber glass cloth 23 in order to provide for controlled yielding (elongation) at the bolt holes within the stress limitations of the plastic canopy. As best shown in Figure 5, I may pre-laminate the mounting edges in halves, the two halves together approximating the minimum thickness of the plastic if they are to be applied to a preformed canopy, in order to permit the addition of extra cement and/or a central strip of resin impregnated cotton or fiber glass cloth if the thickness of the canopy is near the maximum tolerance, since the thickness of the formed canopy may vary as much as a tenth of an inch.

I prefer to pre-laminate and cure the mounting edge strips 19, using an impregnating liquid resin monomer of the same type as used in the production of the plastic canopy, and to use the same resin monomer to subsequently cast, bond, or cement the pre-laminated edge strips to the plastic canopy. Such a resin monomer may be prebodied or partially polymerized to prevent too rapid evaporation and run-off from the joint, and mixed with a suitable light or photosensitive catalyst to enable rapid curing by light, such as ultra violet or sunlight. As an example of such catalysts, reference may be made to the Christ patent, No. 2,367,670, which issued January 23, 1945, wherein benzoin is disclosed. A number of other light sensitive catalysts are commercially available, but the compositions thereof are unknown to me. When applying the laminated edges to a preformed canopy, as shown in Figure 5, I apply transparent molding forms 24 to the sides of the canopy and apply sufficient fluid cement to the mating surfaces, and/or to the outside surfaces of a single edge strip, or between the halves of the edge strips 19 as indicated at 25 in Figure 5, to bring the assembly to the thickness of the canopy edge. Thin cellophane layers may be positioned inside the forms 24 to prevent adhesion of the plastic cement thereto. Thereafter the assembly is exposed to light for a sufficient time to polymerize the cement.

It will be noted that the figures and foregoing description relate to the application of pre-laminated edging strips to a preformed canopy. In so doing it is practical to pre-laminate the fiber glass and cotton material in large flat sheets, later cut to size, beveled and molded to fit the compound curves of the plastic canopy, as well as to join the ends of a plurality of such strips together along the edges of a large or excessively curved plastic panel. Alternatively, the marginal strips can be applied to the flat developed pattern of the canopy prior to the forming thereof as by the well known free-blown method, since the pre-laminated strips, bonded by the same type of resin as used in the canopy, are substantially as flexible, formable and thermoplastic as the canopy material, which is also initially manufactured as a flat sheet. The edging strips can also be used as the boundary for the initial casting and polymerization of the plastic material whereby the plastic bonds itself to the edge strips upon polymerization. Further, if desired, the woven fiber glass and cotton laminae strips can be individually dipped in the liquid monomer resin and built up layer by layer in contact with the plastic canopy edges to be polymerized simultaneously with the bonding thereof to the canopy.

In the event the canopy enclosure or window is built up of laminated plastic as shown in Figure 6, where outer transparent layers 26 are bonded to a central polyvinyl butyral interlayer 27, the butyral layer may be omitted or removed along the edges and a projecting fiber glass laminate 28 substituted therefor, being cemented in place to the sides of the outer layers to transmit the canopy load in shear through the bond therebetween.

As a specific example, a preformed canopy of nominal five-sixteenths inch thickness had fiber glass and cotton cloth edge strips pre-laminated and then cemented to the edges thereof as shown in Figure 2. After bolting into its frame, the canopy was tested up to a load corresponding to twenty pounds per square inch, without failure. This canopy was made to replace a stock production canopy of nominal three-eighths inch thickness, which had been mounted by the conventional grommet and steel sleeve method and had failed under test at a nine pound per square inch load. A sample of laminated plastic plus fiber glass edges as shown in Figure 6, developed a strength of 5110 pounds per square inch in the plastic at failure, as compared to 2000 pounds per square inch with the conventional grommet and liner mounting.

Having described only typical forms of the invention, I do not wish to be limited to the specific details herein set forth, but wish to reserve to myself any variations or modifications that may appear to those skilled in the art or fall within the scope of the following claims.

I claim:
1. An aircraft enclosure adapted to resist internal pressures and the edge tension forces created thereby comprising a transparent body sheet formed of a synthetic resin and having a marginal edge, and an attaching strip for mounting said enclosure which is capable of sustaining higher localized stresses than said body sheet, said attaching strip comprising cemented laminations of woven fiber and having a marginal edge which conforms to, which overlaps, and which is cemented to the marginal edge of said body sheet, whereby to provide an extension on said body sheet to which substantially all of said tension forces are transmitted across the cemented joint connecting the overlapping marginal edges of said body sheet and strip.

2. An aircraft enclosure adapted to resist internal pressures and the edge tension forces created thereby comprising a transparent body sheet formed of methyl methacrylate resin and having a marginal edge, and an attaching strip for mounting said enclosure which is capable of sustaining higher localized stresses than said body sheet, said attaching strip comprising cemented laminations of woven fiber glass and having a marginal edge which conforms to, which overlaps, and which is cemented to the marginal edge of said body sheet, whereby to provide an extension on said body sheet to which said tension forces are transmitted across the cemented joint connecting the overlapping marginal edges of said body sheet and strip, methyl methacrylate cement being the bonding agent both for the woven fiber glass laminations and said cemented joint.

3. An aircraft enclosure adapted to resist internal pressures and the edge tension forces created thereby comprising, as mating parts, a transparent body sheet having a marginal edge, and a strip for mounting said enclosure which is capable of sustaining higher localized stresses than said body sheet, said strip providing an extension on said body sheet and comprising cemented laminations of woven fiber, the marginal edge of one of said parts being formed to provide a groove to receive the marginal edge of the other of said parts, and the two being cemented together to provide a joint across which substantially all of said tension forces are transmitted out of said body sheet and into said strip.

4. An aircraft enclosure adapted to resist internal pressures and the edge tension forces created thereby comprising a transparent body formed of methyl methacrylate resin and having a marginal edge of predetermined shape, and an attaching strip for mounting said enclosure which is capable of sustaining higher localized stresses than said body, said strip providing an extension on said body, having a marginal edge which conforms to the marginal edge of said body and comprising cemented laminations of woven fiber glass, one of said marginal edges being tapered and the other being formed with a V-shaped groove to receive said tapered edge and the two being cemented together to provide a joint across which said tension forces are transmitted to said attaching strip, methyl methacrylate resin being the bonding agent both for the woven fiber glass laminations and the abutting marginal edges of said body and strip.

5. An aircraft enclosure adapted to resist internal pressures and the edge tension forces created thereby comprising a transparent body formed of a synthetic resin and having a tapered marginal edge, and an attaching strip for mounting said enclosure which is capable of sustaining higher localized stresses than said body, said attaching strip providing an extension on said body, having a mating marginal edge formed with a V-shaped groove for receiving the tapered edge of said body and comprising cemented laminations of woven fiber glass, the mating edges of said body and strip being cemented together to provide a joint across which said tension forces are transmitted to said attaching strip.

6. An aircraft enclosure adapted to resist internal pressures and the tension forces created thereby comprising a body sheet formed of a synthetic resin and having a marginal edge, and an attaching strip for mounting said enclosure which is substantially of the same thickness as the marginal edge of said body sheet and which is capable of sustaining higher localized stresses than said body sheet, said attaching strip comprising cemented laminations of woven fiber and having a marginal edge which conforms to, which overlaps, and which is cemented to the marginal edge of said body sheet, whereby to provide an extension on said body sheet to which said tension forces are transmitted across the cemented joint connecting the overlapping marginal edges of said body sheet and strip.

7. An aircraft enclosure adapted to resist internal pressures and the edge tension forces created thereby comprising a transparent body sheet formed of a synthetic resin and having a marginal edge formed with a groove, and a strip for mounting said enclosure which is capable of sustaining higher localized stresses than said body sheet, said strip comprising cemented laminations of woven fiber, having one edge portion cemented in said groove and the other edge portion providing an extension on said body sheet to which substantially all of said tension forces are transmitted across the joint between said body sheet and strip.

8. An aircraft enclosure adapted to resist internal pressures and the edge tension forces created thereby comprising a transparent body sheet formed of methyl methacrylate resin and having a marginal edge formed with a groove, and a strip for mounting said enclosure which is capable of sustaining higher localized stresses than said body sheet, said strip comprising cemented laminations of woven fiber glass and having one edge portion cemented in said groove and the other edge portion providing an extension on said body sheet to which substantially all of said tension forces are transmitted across the joint between said body sheet and strip, methyl methacrylate cement being the bonding agent both for the woven fiber glass laminations and the cemented joint connecting said body sheet and strip.

9. An aircraft enclosure adapted to resist internal pressures and the edge tension forces created thereby comprising, as mating parts, a transparent body sheet having a marginal edge, and a strip for mounting said enclosure which is capable of sustaining higher localized stresses than said body sheet, said strip providing an extension on said body sheet and comprising cemented laminations of woven fabric, the marginal edge of one of said parts being formed to provide a groove to receive the marginal edge of the other of said parts, and the two being cemented together to provide a joint across which substantially all of said tension forces are transmitted out of said body sheet and into said strip.

10. An aircraft enclosure adapted to resist internal pressures and the edge tension forces created thereby comprising, as mating parts, a body sheet consisting of at least two transparent sheets of synthetic resin bonded together by an interlayer of synthetic resin, and a strip for mounting said enclosure which is capable of sustaining higher localized stresses than said laminated body sheet, said strip providing an extension on said laminated body sheet and comprising cemented laminations of woven fabric, said interlayer terminating inwardly of the marginal edges of said transparent sheets to provide a groove to receive the marginal edge of said strip and the two being cemented together to provide a joint across which substantially all of said tension forces are transmitted out of said body sheet and into said strip.

References Cited in the file of this patent

UNITED STATES PATENTS

| Number | Name | Date |
|---|---|---|
| 1,309,758 | Kempton | July 15, 1919 |
| 1,715,702 | Gordon | June 4, 1929 |
| 1,777,309 | Hopkinson | Oct. 7, 1930 |
| 2,287,163 | Bishop | June 23, 1942 |
| 2,311,613 | Slayter | Feb. 16, 1943 |
| 2,322,582 | Marini | June 22, 1943 |
| 2,348,287 | Fiekers | May 6, 1944 |
| 2,362,951 | Wallis | Nov. 14, 1944 |
| 2,374,056 | Watkins | Apr. 17, 1945 |
| 2,374,057 | Watkins | Apr. 17, 1945 |
| 2,387,227 | Andersen et al. | Oct. 23, 1945 |
| 2,429,688 | Hoover | Oct. 28, 1947 |
| 2,432,752 | Gray | Dec. 16, 1947 |

FOREIGN PATENTS

| Number | Country | Date |
|---|---|---|
| 281,040 | Italy | Dec. 19, 1930 |